JOHN W. LYNCH.
Improvement in Piston-Rod Packing.

No. 127,254. Patented May 28, 1872.

Witnesses:
E. Wolff
Geo. W. Mabee

Inventor:
J. W. Lynch
PER
Attorneys.

127,254

UNITED STATES PATENT OFFICE.

JOHN W. LYNCH, OF RICHMOND, VIRGINIA.

IMPROVEMENT IN PISTON-ROD PACKINGS.

Specification forming part of Letters Patent No. 127,254, dated May 28, 1872.

Specification describing a new and Improved Piston-Rod Packing, invented by JOHN W. LYNCH, of Richmond, in the county of Henrico and State of Virginia.

My invention consists of conical sectional rings of metal, wood, or other suitable material, preferably in duplicate, or two sets with a space between for absorbent packing, or an oil-chamber only, which rings are forced into a conical stuffing-box or a bush with a conical bore and cylindrical exterior fitted into the stuffing-box of ordinary construction, and adapting my packing to engines already in use.

Figure 1:
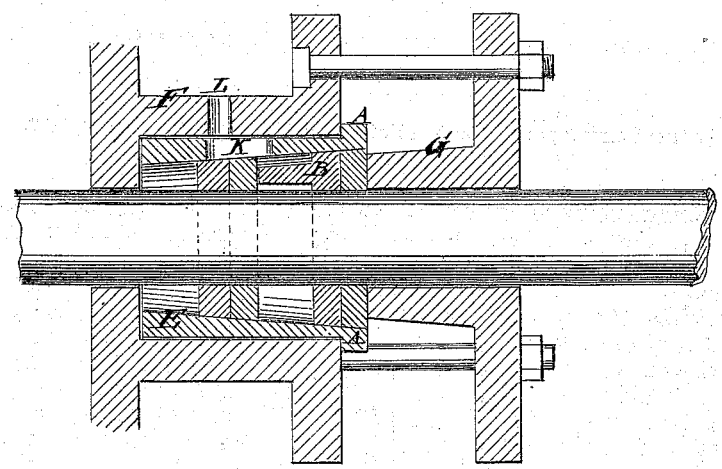
Figure 2:
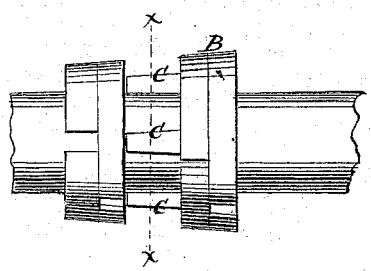
Figure 3:
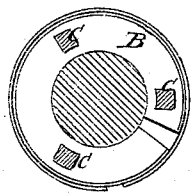

Figure 1 is a longitudinal section of a stuffing-box and packing of my invention. Fig. 2 is a side elevation of the packing and part of the piston-rod, and Fig. 3 is a cross-section on the line $x$ $x$.

Similar letters of reference indicate corresponding parts.

A and B represent two sets of conical sectional packing-rings of metal, hard wood, or any other suitable substance, the sections lapping each other suitably to make steam-tight joints, and one set being smaller than the other and considerably in advance of it, the outermost set having the studs C projecting against the other to keep it in advance the proper distance. These rings are fitted in the conical bore of a bush, E, which is cylindrical on the exterior and fits snugly in the stuffing-box F, of any ordinary construction, whereby I may fit my improved metallic packing to engines now in use. The gland G acts on the outer ring and the studs of the latter act upon the inner one. The conical shape of the packing and the bushing forces said rings down on the rod as they are forced in and pack it steam-tight. They also form a steam-tight oil-space, K, into which oil may be poured through a hole, L, in the top of the stuffing-box, and in which the oil will be so confined that while it lubricates the rod it cannot escape, so as to drip and soil the machine. Absorbent material may be used in this chamber; also in chamber M, if desired.

When the improved packing is to be applied to new engines the stuffing-box may be bored conically, and the bush may be dispensed with.

Having thus described my invention, I claim as new and desire to secure by Letters Patent—

The stuffing-box F, gland G, and bush having conical cavity in the inside, and hole K, in combination with rings A B, the inner, B, of which has studs, C, as described.

JOHN W. LYNCH.

Witnesses:
R. N. NORTHEN,
R. G. MORRISS.